United States Patent
Hagen et al.

[11] Patent Number: 6,148,560
[45] Date of Patent: Nov. 21, 2000

[54] GRAFTING MACHINE

[75] Inventors: Randall H. Hagen, Sebastopol, Calif.; Wesley Scott Allen, Washougal; Richard Randall Johnson, Vancouver, both of Wash.; Allen Wayne Fadenrecht, Boring; James Philip Hopkins, Gresham, both of Oreg.; Patrick Ryan Ebert, Vancouver, Wash.

[73] Assignee: Vinifera, Inc., Petaluma, Calif.

[21] Appl. No.: 09/071,548

[22] Filed: May 1, 1998

[51] Int. Cl.⁷ ..................................................... A01G 1/06
[52] U.S. Cl. ..................................................................... 47/6
[58] Field of Search .................... 47/6, 7, 1.01 R; 83/352, 862, 871, 915.3, 869; 451/419; 144/91; 30/279.2, 279.4, 303, 304, 299, 369, 484, 487, 493, 121, 373, 173

[56] References Cited

U.S. PATENT DOCUMENTS

| | | |
|---|---|---|
| 2,962,633 | 11/1960 | Raymond . |
| 3,584,411 | 6/1971 | Broersma . |
| 3,680,255 | 8/1972 | Grigorov . |
| 3,726,164 | 4/1973 | Cocquebert ............................ 83/1 |
| 3,758,099 | 9/1973 | Scott ................................... 269/58 |
| 3,815,456 | 6/1974 | Braathen et al. ...................... 83/68 |
| 3,933,065 | 1/1976 | Janu et al. ............................ 83/62 |
| 3,962,633 | 6/1976 | Nadeau ............................. 324/150 |
| 3,969,843 | 7/1976 | Wahler et al. .......................... 47/6 |
| 4,014,132 | 3/1977 | Cook ..................................... 47/6 |
| 4,098,020 | 7/1978 | Cook ..................................... 47/6 |
| 4,392,304 | 7/1983 | Plesa ................................. 30/178 |
| 4,590,834 | 5/1986 | Sobel ................................ 83/455 |
| 4,601,129 | 7/1986 | Peev et al. ............................. 47/6 |
| 4,628,783 | 12/1986 | Brownell, Sr. et al. ............ 83/862 |
| 4,654,999 | 4/1987 | Raggett ................................. 47/6 |
| 4,769,944 | 9/1988 | Fresne et al. ......................... 47/6 |
| 4,923,379 | 5/1990 | Tomminen ......................... 425/63 |
| 4,937,971 | 7/1990 | Collas et al. ........................ 47/58 |
| 5,209,011 | 5/1993 | Mori et al. ............................ 47/6 |
| 5,444,938 | 8/1995 | Pissenberger ......................... 47/6 |

FOREIGN PATENT DOCUMENTS

| | | |
|---|---|---|
| 2 539 951 | 2/1983 | France . |
| 2 594 629 | 1/1986 | France . |
| 80651 | 3/1919 | Germany . |
| 2207614 | 9/1973 | Germany . |

*Primary Examiner*—Michael J. Carone
*Assistant Examiner*—Son T. Nguyen
*Attorney, Agent, or Firm*—Klarquist Sparkman Campbell Leigh & Whinston

[57] ABSTRACT

A grafting system for cutting the end of a plant material includes a frame for holding the plant material and a blade assembly mounted to the frame. The blade assembly includes a blade that is movable at an angle oblique to the longitudinal axis of the plant material into cutting engagement with the plant material. The system also includes an actuating system for moving the blade into cutting engagement with the plant material.

9 Claims, 6 Drawing Sheets

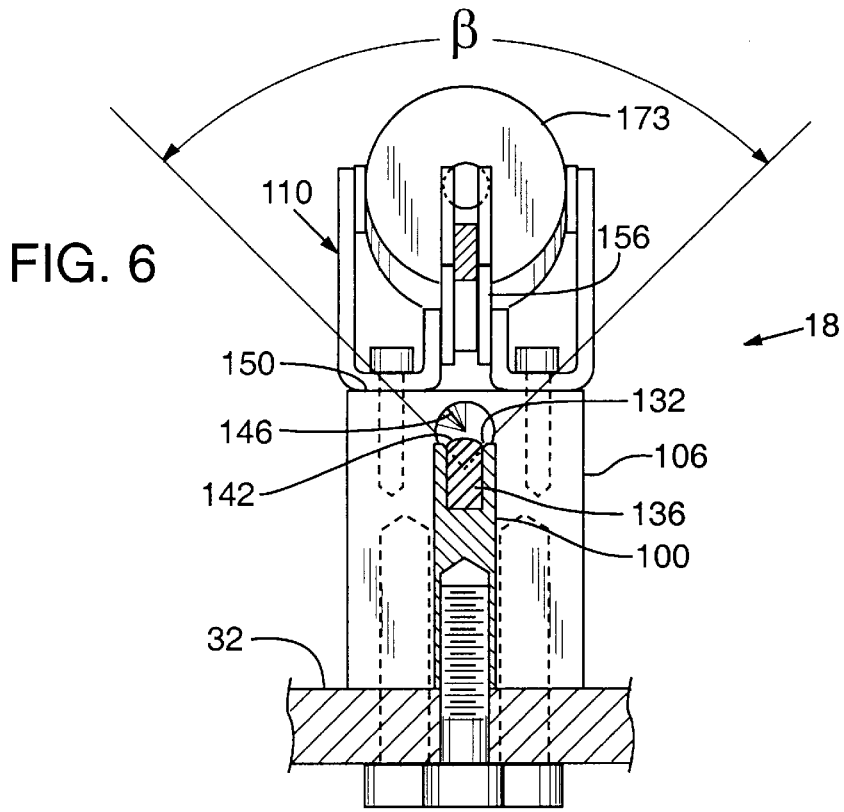
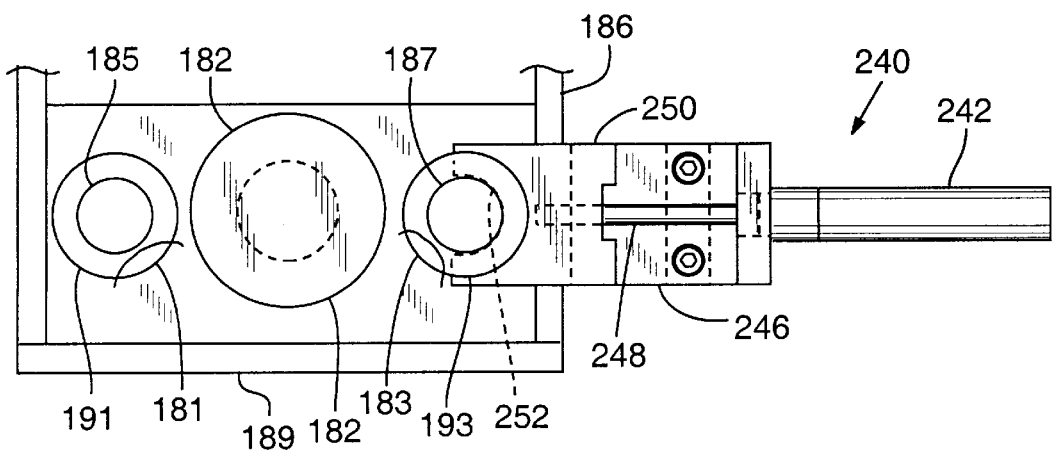

GRAFTING MACHINE

BACKGROUND OF THE INVENTION

The present invention relates to a system for preparing the mating ends of rootstock and scions for grafting and is particularly well suited for softwood grafting operations (sometimes referred to as "green grafting" or "herbaceous grafting").

Grafting typically involves the end-to-end connection of a scion to a rootstock of comparable diameter. Several types of graft unions are known, one of the most common being a tapered cut joint (or "cleft" graft) in which the scion end is trimmed to have a wedge or "V" shaped cross-section, and the stock end is slit longitudinally down its center to provide a mating slot to receive the trimmed scion end. Historically, the scion and stock ends were trimmed by hand, a relatively unsafe and inefficient procedure that produces grafts of inconsistent quality, dependent upon the skill of the manual laborer. In modern times, however, most stock ends are prepared using a mechanical cutter.

Green grafting involves the end-to-end connection of relatively immature, fragile scions to rootstock of comparable diameter. In this application, the step of trimming and joining the stock and scion ends is even more critical and requires greater precision than grafting procedures involving lignified plant material because less plant tissue is available to promote a successful graft. Green grafting typically involves scion and rootstock diameters between 2.5 and 10 mm, whereas dormant bench grafting typically involves diameters of 5 to 15 mm. Thus, there generally is less margin for error in cutting for green grafting. Also, the non-lignified soft plant tissue is more susceptible to drying out and more vulnerable to various diseases. As a result, efforts have been made to develop more effective ways of trimming scion and stock ends, especially those used in green grafting operations. Today, most bench grafts are done with machine cutters.

However, prior attempts to develop machines for trimming scion and stock ends have not been entirely satisfactory. See, for example, U.S. Pat. No. 3,680,255 to Grigorov, U.S. Pat. No. 3,969,843 to Whaler et al., and U.S. Pat. No. 4,769,944 to Fresne et al.

Many, if not all, of the prior machines trim the scion using blades that drop perpendicular to the longitudinal axis of the scion. Thus, the blades cut against the "grain" of the scion, which tends to smash the scion, tearing the tissue, rather than cleanly cutting through the scion. A less clean scion cut decreases the likelihood of a successful graft.

The scions cut by prior art machines are less likely to produce successful grafts than scions cut by hand. It is estimated that hand cutting produces about 15% more successful grafts than prior machines. Thus, to achieve the higher success rate, at least one company still continues to cut their scions for green grafting by hand.

Thus, there remains a need for an improved automatic grafting system which cuts the scion or stock more cleanly, completely, and precisely, without tearing the plant tissue, thereby producing a relatively high percentage of successful grafts. There also remains a need for a system that can be easily operated and maintained, and yet is safer for the operator.

SUMMARY OF THE INVENTION

It is an object of this invention, therefore, to provide an improved semi-automatic grafting system that produces a clean cut, which will increase the percentage of successful grafts.

A further object of the invention to provide a system that minimizes the amount of torn or disrupted plant tissue from cutting.

More specifically, according to the present invention, a semi-automatic grafting system provides a frame for holding plant material, a blade assembly mounted to the frame and having a blade. The blade is movable at an angle oblique to the longitudinal axis of the plant material and into cutting engagement with the plant material. The invention also has an actuating system for moving the blade assembly into cutting engagement with the plant material.

As another aspect of the invention, the system has a second blade and two blade mounting members. Each of the blades is movably mounted to one of the blade mounting members, and the blades are movable along paths that are substantially symmetric to one another about the longitudinal axis of the plant material. The paths end adjacent one another so that each blade moves through the plant material, cutting it substantially into a "V" shape.

Other objects and advantages of the present invention will be apparent from the following description and the accompanying drawings.

BRIEF DESCRIPTION OF THE DRAWINGS

FIG. 6 is a cross-sectional view of the grafting system, taken along lines 6—6 of FIG. 5.

FIG. 7 is a side view of an end of a scion cut by the grafting system of FIG. 1.

FIG. 8 is a perspective view of the end of the scion of FIG. 7.

FIG. 11 is a cross-sectional view taken along lines 11—11 of FIG. 2.

DETAILED DESCRIPTION OF THE INVENTION

The present invention is a grafting system for trimming or cutting the ends of scions or rootstock and is suited particularly for use as part of a green grafting operation. Nevertheless, the principles of the present invention are applicable to other operations. The present invention works well on both actively growing green and actively growing lignified material, but will also work on smaller dormant cuttings.

Figure 1:
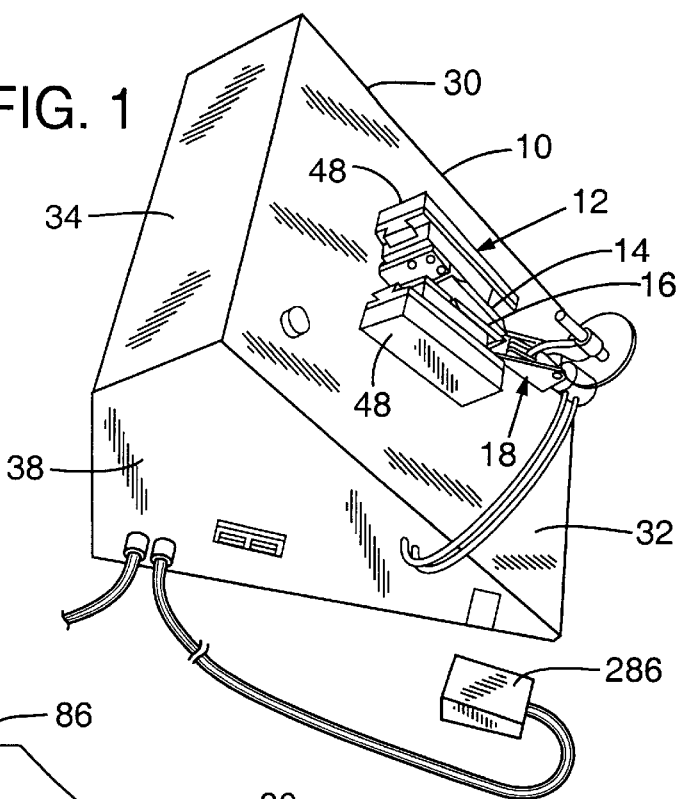
FIG. 1 is a perspective view of a grafting system in accordance with the present invention.

As shown in FIG. 1, the illustrated embodiment of the present invention includes a frame 10, a blade assembly 12 having a right blade 14 and a left blade 16, and a scion support assembly 18 for holding a plant material, such as a scion 20, in place. The blades 14, 16 are slidable at an angle oblique to the longitudinal axis of the scion 20 to bevel an end of the scion, as will be described in greater detail below. The illustrated embodiment also includes an actuator assembly 22, as shown in FIG. 2, for actuating the blades 14, 16 to cut the scion 20.

Figure 2:
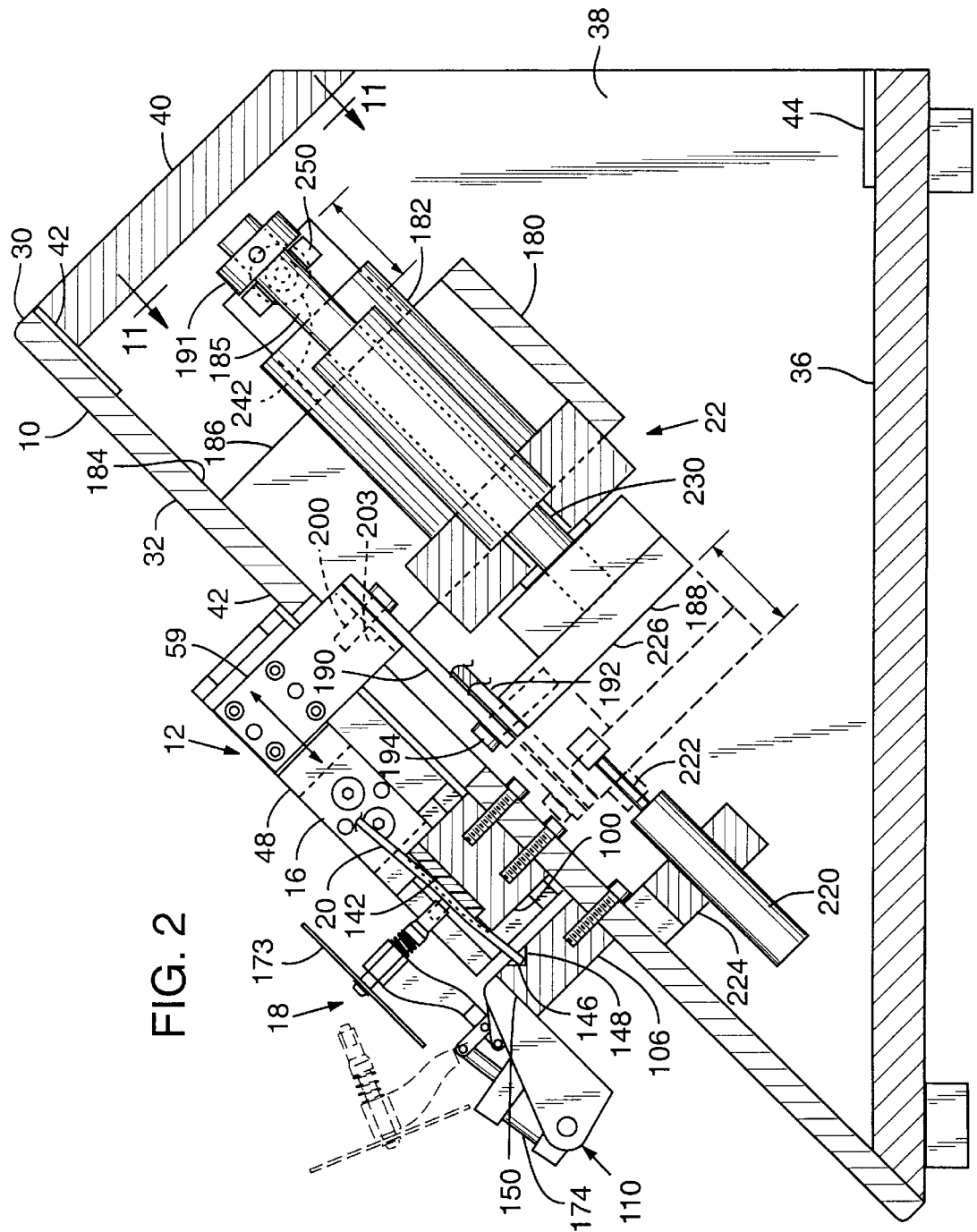
FIG. 2 is a cross-sectional view of the grafting system of FIG. 1.

As shown in FIGS. 1 and 2, the frame 10 includes a housing 30 having a slanted front face plate 32, a removable back cover 34, a bottom plate 36, a right side plate (not shown), and a left side plate 38, which are assembled together to form a box-like enclosure. The housing 30 also includes hollow box beams 40 and reinforcing plates 42, 44 to which the removable back cover 34 attaches. The illustrated housing 30 is made of stainless steel, although other materials having sufficient rigidity and corrosion-resistance also will work, and is fastened together by bolts or other fastening methods. The housing 30 provides a support for the blade assembly 12 and houses the actuator assembly 22 therein.

Figure 4:
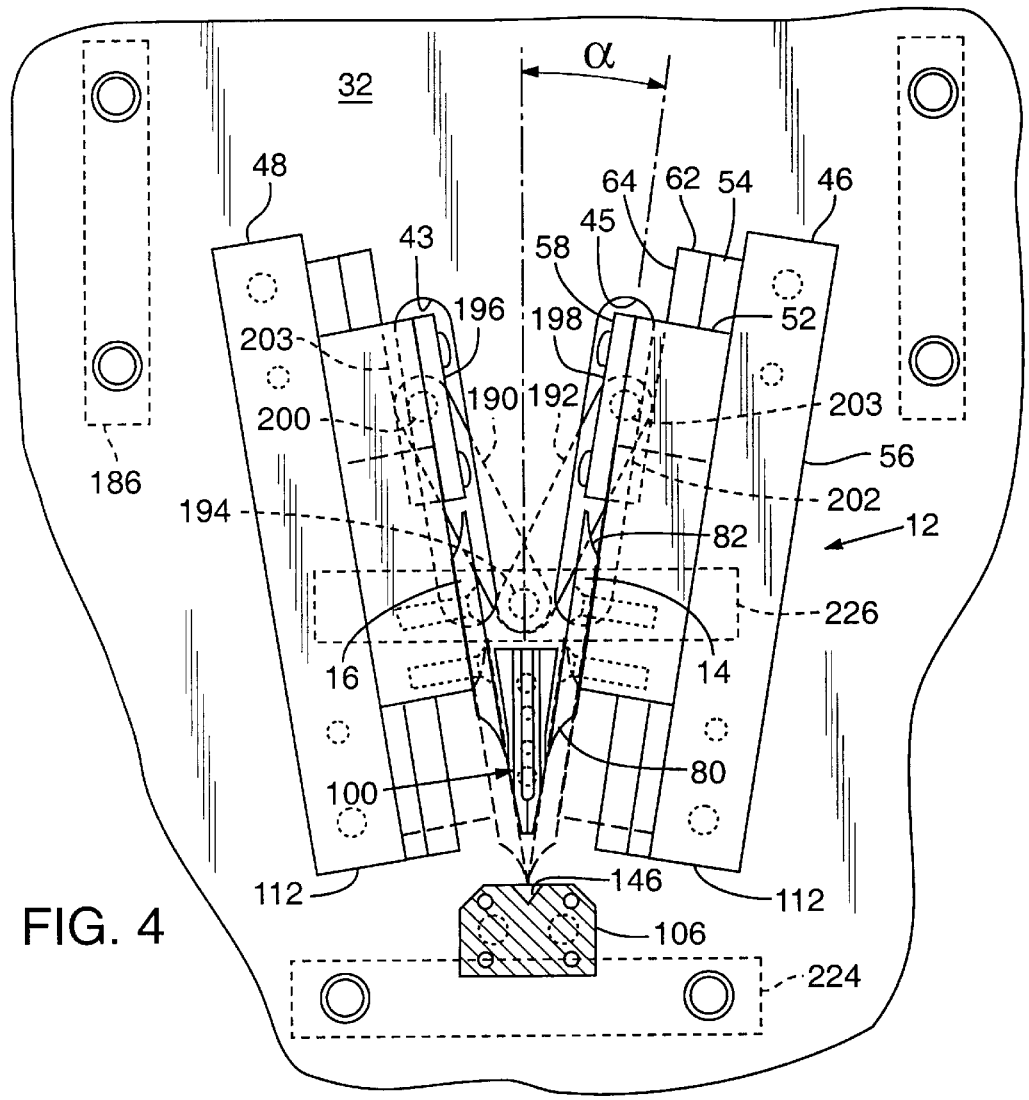
FIG. 4 is a front view of the grafting system of FIG. 1.

The front face plate 32 slopes upwardly at an angle of about 45 degrees from horizontal. A 45 degree angle has been found to be comfortable for the operators of the system, but any angle could be used. Two slots 43, 45 are cut out of the face plate 32, as best seen in FIG. 4, for allowing a connecting plate to extend therethrough for connecting the blade slide assembly 12 to the actuator assembly 22, as will be described below.

The blade slide assembly 12 is mounted to the upper surface of the front face plate 32. The scion support assembly 18 also is mounted to the upper surface, between and partially beneath the blades 14, 16 of the blade slide assembly 12, to hold the scion 20 (FIG. 2) in a location that is crossed by the path of the moving blades.

The blade slide assembly 12 allows each blade 14, 16 to slide along a path positioned at an angle oblique to the longitudinal axis of the scion 20 and that crosses obliquely through the end of the scion 20. The paths are substantially symmetric to one another about the longitudinal axis of the scion 20 and end adjacent one another so that when the blades 14, 16 move through the scion 20, they cut the end of the scion 20 substantially into a "v" shape, as shown in FIGS. 7 and 8. Although in the described embodiment, the oblique cut is achieved with a slidable blade assembly, a pivotable assembly could be used instead.

Cutting the scion 20 at an angle oblique to its longitudinal axis provides a clean cut, which does not tear or smash the scion 20 significantly. Thus, a scion 20 cut with the grafting system of the present invention is more likely to result in a successful graft than one cut with a machine in which the blade 14, 16 cuts through a scion at an angle perpendicular to the longitudinal axis.

A scion cut by the grafting system of the present invention is just as likely to "take," in other words result in a successful graft, as a scion trimmed by hand, and is more likely to "take" than a scion cut by a prior art machine, in which the blade cuts through the scion at an angle perpendicular to the longitudinal axis of the scion. More specifically, about 70–90% of scions cut by the present invention "take". The same percentage of hand-cut scions "take"; whereas only about 55–75% of scions cut by the prior art machines "take".

The present grafting machine is advantageous over hand grafting because it produces more consistent graft cuts, and requires less employee training and less employee skill than hand grafting. Also, the present grafting machine is safer than hand grafting, which results in less employee injuries, and thus reduces the employer's workmen's compensation payouts and medical bills.

The blade slide assembly 12 includes right and left assemblies 46, 48. For ease of description, only the right assembly 46 will be described here with the understanding that the left assembly 48 is a mirror image of the right assembly 46.

Figure 3:
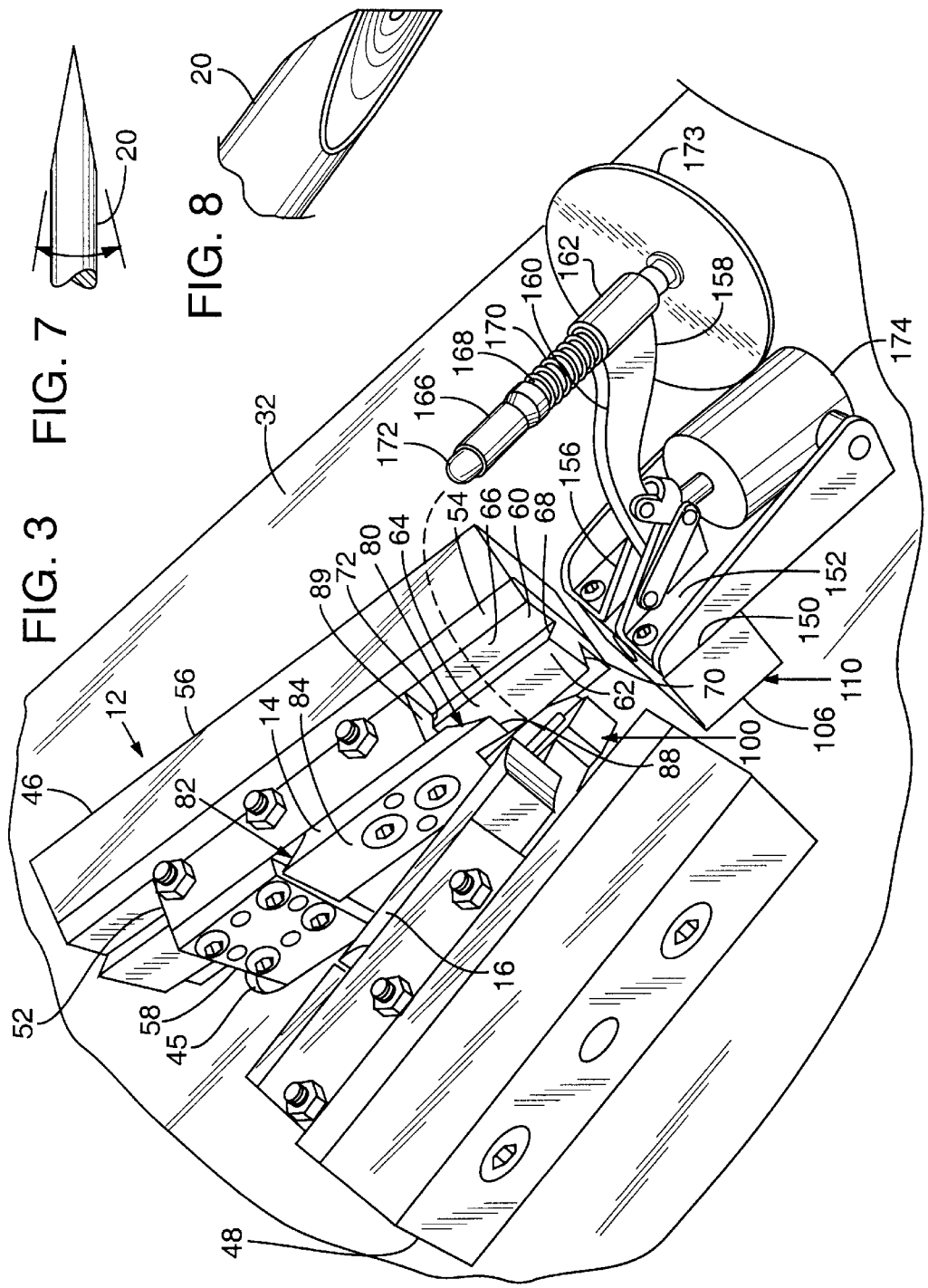
FIG. 3 is a detail view of a blade and hold-down assembly of the grafting system of FIG. 1.

As seen best in FIG. 3, the right blade slide assembly 46 includes the right blade 14, a blade mount 52, a slide 54, a slide mount 56, and a connecting plate 58. In the illustrated embodiment, the slide mount 56, which is a rectangular block of aluminum, is fastened to the front face plate 32 by bolting, although other fastening means can be used. The slide mount is tilted relative to the vertical, longitudinal centerline of the front face plate, as will be described in greater detail later.

The slide 54 has a base 60 with a central, longitudinal runner 62 protruding upwardly therefrom. The top surface 64 of the runner 62 is parallel with the top surface 66 of the base 60 but the sides 68, 70 of the runner angle inwardly from the top surface 64 of the runner to the top surface 66 of the base. The slide 54 is fastened to the slide mount 56 and is made of steel, which is nickel-plated for corrosion resistance.

The blade mount 52 provides a base for the blade 14 and allows the blade 14 to slide on the slide 54. The blade mount 52 is a rectangular block of nickel-plated steel, and has a dovetail groove 72 defined therein. The shape of the groove 72 complements the shape of the runner 62 so that the two pieces mate in slidable relationship to one another. Slides and blade mounts of other shapes could be used, and even other apparatuses could be used for allowing the blade to slide relative to the plant material.

Figure 9:
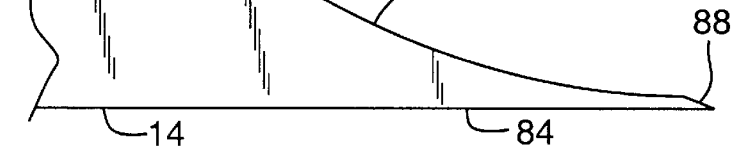
FIG. 9 is a detail, end view of the blade of the grafting system of FIG. 1.

In the illustrated embodiment, as seen best in FIGS. 3 and 9, the blade 14 is made of ¼ inch thick corrosion-resistant stainless steel, such as the type used in cutlery, and is approximately 1.25 inches wide. This width is approximately twice as wide as necessary to cut through the plant material to help reduce stress on the blades when the blades come together after cutting through the plant material, as will be described in greater detail below. Other thicknesses and widths could be used.

The blade 14 has first and second cutting edges 80, 82 (FIG. 3). The second cutting edge 82 is not necessary but allows the blade 14 to be reversed, thereby providing a useful life twice as long as a blade with a single cutting edge. Both the first and second cutting edges are cut from the back side 86 of the blade 14 and are formed by a hollow grind 87, as illustrated best in FIG. 9. The illustrated hollow grind extends about 0.5 inches inwardly from the edge of the blade and is formed using a round grinding wheel; however, other sizes of hollow grinds and other methods for achieving hollow grinds could be used. A hollow grind provides good cutting action and a cleaner cut than a beveled blade not having a hollow grind. Nevertheless, a beveled blade could be used.

After the hollow grind is formed, the tip 88 of the blade 14 is sharpened at approximately a 10–12 degree angle. However, the top surface 84 of the blade 14 is entirely flat; that is, the top surface is not sharpened at all.

The blade 14 is mounted to the lower end of the blade mount 52 so that the entire hollow grind 87 on the lower cutting edge, plus a small portion of the non-sharpened and non-ground portion of the blade 14, protrudes past the bottom 89 of the blade mount 52. The blade is fixed to the blade mount 52 by fasteners in locations symmetric about the transverse center line of the blade 14, so that the blade can be removed and flipped once the exposed cutting edge 80 has worn down.

Figure 5:
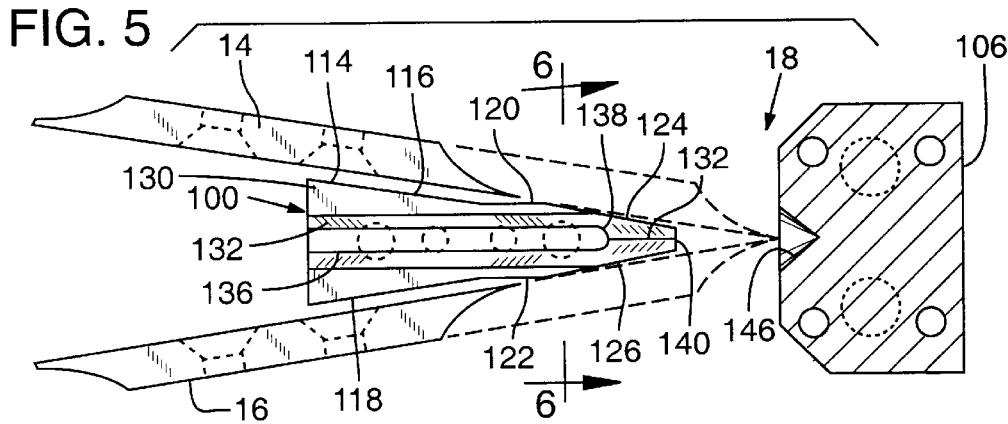
FIG. 5 is a detail view of the blades, scion stand, and cutting block of the grafting system of FIG. 1.

The blade 14 and blade mount 52 are slidable on the slide 54 from a retracted position, as shown in FIGS. 3–5, into cutting engagement with the scion 20, and into an engaged position, as indicated in dashed lines in FIGS. 4 and 5. In the engaged position, the tips 88 of the left and right blades 16, 14 contact each other, although this is not necessary.

Although in the illustrated embodiment the blades slide in a straight path between the retracted and engaged positions, the grafting system could be designed such that the blades travel in an arcuate path.

In the illustrated embodiment, the blade 14, along with the blade mount 52, slide 54, and slide mount 56, are positioned at an angle, α (FIG. 4), which is about 9.5 degrees from the longitudinal, upright centerline of the front face plate 32. Angles in the range between 7 and 11 degrees are preferable; although angles between 5 and 15 degrees will work well also. Even angles between 3 and 20 degrees could be used.

Also, the optimal angle for α is somewhat dependent on the diameter of the scion being cut. The smaller the diameter of the scion—the shallower (closer to the longitudinal axis) the angle should be.

The connecting plate 58 is mounted to the blade mount 52 above the blade, for instance by bolting. As shown in FIG. 3, the connecting plate 58 is a rectangular block, that extends from the blade mount 52, through the slot 45 in the front face plate 32, and into the housing 30 to connect with the actuator assembly 22, as will be described later. The illustrated connecting plate is made of nickel-plated steel with a wear-resistant coating, although other materials and coatings could be used.

As shown in FIGS. 4–6, the scion support assembly 18 includes a scion support member 100 for helping to hold the scion 20 in place before, during, and after cutting. The scion support assembly 18 (FIG. 2) also includes a stand member 106, which serves to locate and support the bottom of the scion 20 before and during cutting, and to support a hold down clamp assembly 110. The clamp assembly 110 is movable to clamp the scion 20 against the scion support member 100 before and during cutting and to release the scion when desired, for instance, after cutting.

The scion support member 100 is mounted to the front face plate 32 between the lower ends 112 (FIG. 4) of the right and left assemblies 46, 48. As seen best in FIG. 5, the top portion 114 of the support member 100 is wedge-shaped, with each of the upper sides 116, 118 tapering downwardly and inwardly at a 9.5 degree angle to extend in parallel relationship to the respective paths of blades 14, 16. The scion support sides have respective middle side portions 120, 122 that do not taper inwardly and hence are parallel to one another, and respective bottom side portions 124, 126 that taper inwardly at a 9.5 degree angle from vertical (again in parallel relationship to the converging paths of blades 14, 16). The converging top surfaces of blades 14, 16 extend in parallel contact with the respective bottom side portions 124, 126 of the support member 100 but do not contact the upper side portions 116, 118 or middle side portions 120, 122.

Referring to FIG. 5, the top surface 130 of the support member 100 has a central, longitudinal, "v"-shaped channel 132 for supporting the scion 20. The channel 132 extends the length of the support member 100 and is beveled at an angle, β (FIG. 6), of about 82 degrees. A rectangular groove 136 is cut into the bottom of the "v"-shaped channel 132. In the illustrated embodiment, the groove 136 is about 0.3 inches deep and terminates at a radiused end 138 short of the bottom 140 of the support member 100. The illustrated support member 100 is made of Delrin™ of about 1.5 inch thickness, although other materials or thicknesses can be used.

A rectangular piece of resilient material 142 (FIG. 6) is squeezed into the groove 136 in the scion support member 100 to give the scion 20 a cushioned surface on which to rest. In the illustrated embodiment, rubber is used as the resilient material, although other materials also will work.

The stand member 106 is mounted to the front face plate 32 beneath the left and right assemblies 46, 48 and the scion support member 100. The stand member 106 is made of aluminum of a thickness of about 1.875 inches, although other materials and thicknesses would work. The top surface of the stand member 106 has a recess 146, ⅜ inch in diameter and countersunk into a "v" shape. The center of the recess 146 almost is aligned with the center of the channel 132 in the scion support member 100 so that when the scion 20 is placed in the channel 132 of the scion support member 100, as shown in FIG. 2, the bottom end 148 of the scion 20 rests in the recess. The alignment should be close enough to allow the scion 20 to rest in the support member 100 with the bottom end 148 resting in the recess 146 of the stand member 106.

As shown in FIG. 3, the scion hold down clamp assembly 110 is mounted to the front surface 150 of the stand member 106 and is movable for holding the scion 20 in the scion support member 100. The clamp assembly 110 has a clamp base 152, which is mounted to the stand member 106 and has a yoke 156, and a clamp member 158. However, other types of clamp assemblies could be used.

The clamp member 158 has an arm 160 pivotably held by the yoke 156 on the clamp member 158 and a sleeve 162 attached to the end of the arm, into which fits a cylindrical rod 166. The rod 166 has a plunger 168 slidably mounted therein, and a spring 170 extends between the plunger 168 and the sleeve 162 to force the plunger outwardly but to allow the plunger to retreat when the plunger is pressed against the scion 20, as indicated in FIG. 2. The end of the plunger 168 has a plunger button 172, which preferably is made of a material soft enough not to damage the scion 20 when it is pressed thereagainst.

A hold down actuator 174 is mounted to both the base 152 and the arm 160 to pivot the clamp member 158 through about 90 degrees between a rest position, as shown in FIG. 3, and a hold down position, as shown in FIG. 2, in which the button 172 is pressed against the scion 20 to hold the scion 20 in the scion support member 100. In the illustrated embodiment, the hold down actuator 174 is an air cylinder.

The clamp assembly 110 also has a translucent, circular shield 173 mounted near the sleeve 162. When the clamp member 158 is in the hold down position, the shield 173 covers the area of the scion support member 100 for helping prevent any plant material from flying away from the front face plate 32 and injuring an operator during the cutting process.

Other types of clamp assemblies could be used, or variations could be made to the illustrated clamp assembly. For instance, the arm 160 could be longer than that illustrated, and likewise the hold down actuator could have a longer stroke. In addition, the plunger button 172 could be triangular-shaped instead of round as it is illustrated. Such variations might lessen the chance that the scion would be bruised by the clamp assembly.

As shown in FIG. 2, inside the housing 30 is the actuator assembly 22, which includes a push slide assembly 180 for sliding the blades 14, 16 between the retracted position and engaged position. The push slide assembly 180 includes a push slide air cylinder 182 fastened to the underside 184 of the front face plate 32 by a mounting bracket 186. A rectangular push plate 188 is fixed to the lower end of the push slide cylinder 182.

On each side of the push slide cylinder 182 is a guide pin 181, 183, as shown in FIG. 11. The guide pins 181, 183 are also connected to the push plate 188 and smoothly guide the push slide cylinder to stabilize the push slide assembly from twisting or binding. Each guide pin has a neck 185, 187 extending outwardly from a plate 189 through which the push slide cylinder 182 and guide pins slide. Near the outward end of each neck 185, 187 is a head 191, 193 of larger diameter than the neck. Such a system having a cylinder and guide pins is commonly available, for instance, from Bimba Manufacturing Company of Monee, Ill. (708-534-8544).

Left and right connecting bar linkages 190, 192 are attached by a single, push plate pivot pin 194 to the top of the push plate 188, as shown in FIG. 2, and in FIG. 4 in dashed lines. The top ends 196, 198 of each of the left and right connecting bar linkages 190, 192 are connected by a connecting plate pivot pins 200, 202 to extension plates 203 on the right and left connecting plates 58, 59, respectively, which plates are fixed to the blade mounts 52. Thus, the connecting bar linkages 190, 192 form a "V" shape.

The push slide cylinder 182 moves the push plate 188 between a retracted position, as shown in solid lines in FIG. 2, and an extended position, as shown in dashed lines in FIG. 2. As the push plate 188 moves between the retracted and extended positions, the connecting bar linkages 190, 192 pivot outwardly about the push plate pivot pin 194, as the connecting plates 58, 59 are pulled downwardly along the slots 43, 45. Because the connecting plates 58, 59 are mounted to the slide mounts 56, which are mounted to the blades 14, 16, this movement causes the blades to slide along the slide 54 from their retracted positions to their engaged positions.

Although in the illustrated embodiment the slides are pulled from their retracted to engaged positions, the slides could be pushed between these positions instead. Also, the slides could be operated independently and need not be linked together. However, pulling the linked blades is advantageous in achieving blades that strike the scion simultaneously, and thereby result in a better cut.

Also mounted to the underside 184 of the front face plate 32 is a shock absorber 220. The illustrated shock absorber 220 is a hydraulic, preferably oil, cylinder with a retractable piston 222, although other types of shock absorbers, such as air cylinders or soft foam, could be used. A shock absorber mounting bracket 224 holds the shock absorber 220 in a position so that the retractable piston 222 is spaced a few inches from the underside 226 of the push plate 188. In the illustrated embodiment, the shock absorber 220 is positioned near the top of the push plate 188, although being positioned anywhere along the push plate 188 would work. The piston 222 is spaced far enough from the push plate 188 so that the push plate strikes the piston 222 once the blades 14, 16 have cut almost entirely through the scion 20.

When the push plate 188 hits the piston 222, the piston retracts into the shock absorber 220, as shown in dashed lines in FIG. 2, slowing down the movement of the push plate 188, along with all the components connected thereto, including the blades 14, 16. Thus, the blade movements are slowed down to cushion the impact when the left and right blade tips 88 contact each other, thereby reducing the stress on the blades.

Once the push plate 188 reaches its extended position, the piston 230 (FIG. 2) of the push slide cylinder 182 retracts to return the push plate 188 to the retracted position. Meanwhile, the shock absorber piston 222 moves to its extended position, as shown in solid lines in FIG. 2, so that it is ready to cushion the next blade movement.

As shown in FIG. 11, the push slide assembly 180 also includes a safety stop assembly 240 for ensuring that the blades 14, 16 do not move or slide unintentionally. The safety stop assembly 240 includes a spring extension air cylinder 242 mounted to the mounting bracket 186 for the push slide assembly 180 by a support bracket 246. The spring-actuated retractable rod 248 of the spring extension air cylinder 242 has a stop block 250 mounted to its end. In the illustrated embodiment, the stop block 250 is rectangular with semi-circular groove 252 sized to complement the neck 187 of the guide pin 183. The stop block 250 is also about the same height as the neck of the guide pin. Thus, when the stop block 250 is engaged with the neck 187, and when the actuator assembly 22 is off, the head 193 of the guide pin 183 prevents the guide pin from moving out of its extended position. Because the guide pin 183 is interconnected with the push slide cylinder 182, movement of the push slide cylinder 182 is prevented also.

Figure 10:
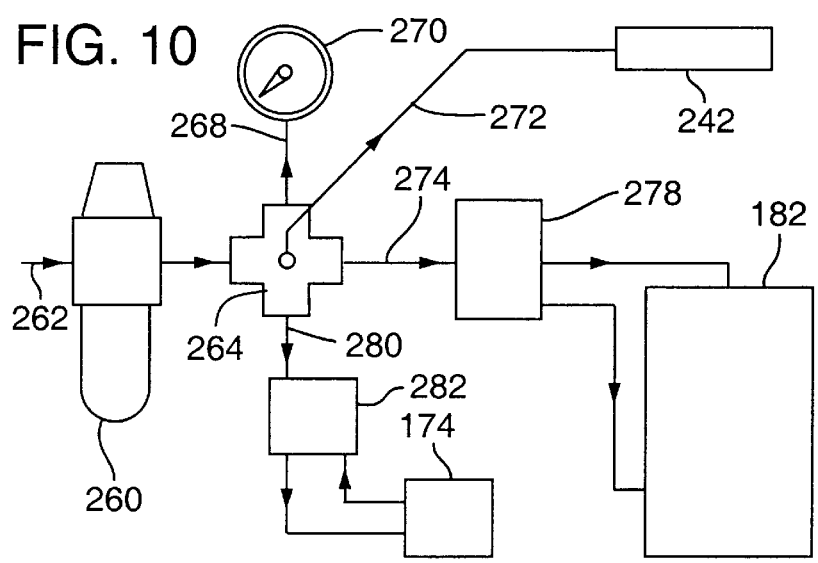
FIG. 10 is a block diagram of the pneumatic actuating system for the grafting system of FIG. 1.

FIG. 10 shows a schematic, pneumatic diagram for the actuator assembly 22. Air enters a pressure regulator 260 through line 262 and then continues into a four-way valve 264. From there, some air is directed through line 268 to a pressure gauge 270, some through line 272 to the safety stop cylinder 242, some through line 274 via solenoid valve 278 to the push slide cylinder 182, and some via line 280 to solenoid valve 282 to the hold down actuator 174.

To operate the grafting system, a user presses a foot pedal 286 (FIG. 1), which actuates the hold down actuator 174 to pivot the clamp member 158 against a scion, which has been placed in the recess 146 of the stand member 106 and rests along the channel 132 in the scion support member 100, as previously described. While the foot pedal is still pressed, the user then presses two buttons (not shown), one located on each side plate 38, causing the air to travel through the actuator assembly 22. Also, as air is delivered to the actuator assembly 22, some of this air is channeled to the spring extension air cylinder 242 of the safety stop assembly 240. When air reaches the spring extension air cylinder 242, this causes the retractable rod 248 to retract, thereby moving the stop block 250 away from the guide pin. With the stop block retracted, the piston of the push slide cylinder 182 is actuated to move forward (to the left in FIG. 2). As the push slide actuator moves forward, and is guided along a straight path by the guide pins, the push plate 188 is moved forward also, toward its extended position. The movement of the push plate 188 pulls the connecting bar linkages 190, 192 forward, along with the connecting plates 58, 59 attached thereto. The pivot pins 200, 202 allow the upper ends of the connecting bar linkages 190, 192 to move outwardly.

As the connecting plates 58, 59 move forwardly, they pull the blade mounts 52 with them, which slides the blades 14, 16 from the retracted positions into the engaged positions. Specifically, the blade mounts 52 slide along the slides 54, causing the blades 14, 16 to move from the retracted positions to the engaged positions. During the travel, the top surfaces 84 of the blades 14, 16 slide along the bottom side portions 124, 126 of the scion support member 100. At some point along the bottom side portions 124, 126, which point depends on the diameter of the scion, the blade tips 88 contact the scion 20 and begin to cut therethrough.

At about this point, the push plate 188 of the actuator assembly 22 hits the retractable piston 222 of the shock absorber 220, which decreases the speed at which the blades 14, 16 are traveling. The blades 14, 16 continue to travel through the scion 20 to fully cut through the scion, each blade beveling a side of the end of the scion 20, thereby trimming the end into a "v" shape, as shown in FIGS. 7 and 8. Once the push plate 188 reaches its extended position, the piston 230 of the push slide cylinder 182 retracts, thereby reversing the process just described to return the blades 14, 16 from the engaged positions to the retracted positions.

When the desired amount of cutting is complete, the air to the system in shut off. This causes the spring (not shown) in the spring extension air cylinder 242 of the stop block assembly 240 to move the stop block 250 against the guide pin to prevent the piston of the push slide cylinder 182, and thus the blades, from accidentally moving forward. Alternatively, the stop block could be moved against the guide pin after the blade returns to its retracted position.

Figure 12:
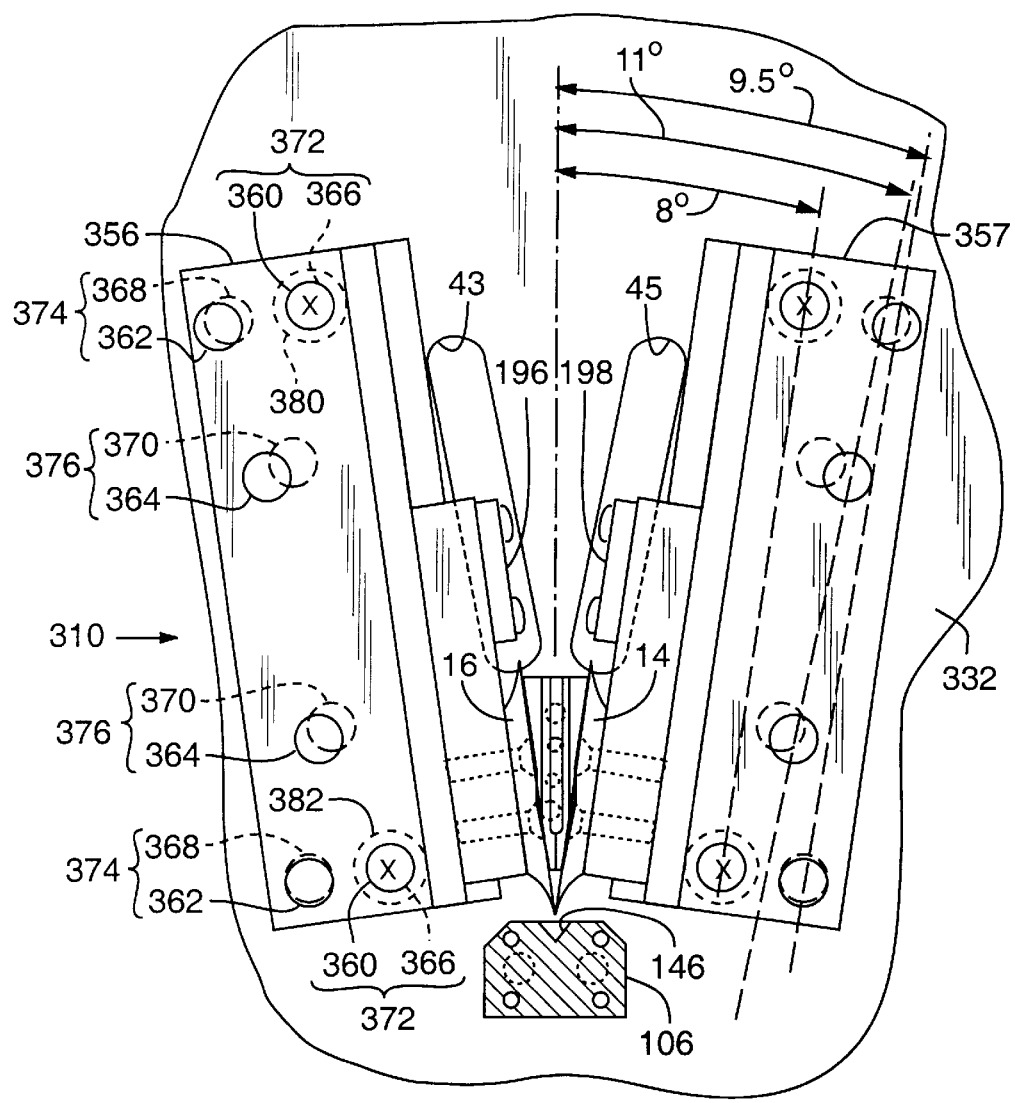
FIG. 12 is a front view of a second embodiment of a grafting system in accordance with the present invention.

As shown in FIG. 12, a second embodiment of the grafting system 300 has adjustable angles at which the blades travel and cut through the scion ("blade angles"). In this embodiment, the slide mounts 356 have an angle adjustment system 310, which allows the slide mounts 356 to be mounted to the front face plate 332 at various predetermined angles. Because the location of the slide mounts 356 determines the locations of the components attached to the slide mounts (the slides 354, the blade mounts 352, the blades 314, 316, and the connecting plates 358), mounting the slide mounts 356 at a different angle changes the angle of all the attached components, thus allowing adjustment of the blade angles.

The left and right slide mounts 356, 357 of the second embodiment are symmetric about the longitudinal centerline of the front face plate 332, and therefore only the left slide mount 356 and its associated elements are described.

The angle adjustment system 310 is achieved by providing each slide mount 356, 357 with three sets of thru-holes 360, 362, 364 for mounting the slide mount to the front face plate 332.

The front face plate 332 also has three sets of thru-holes 366, 368, 370. Each set of face plate thru-holes 366, 368, 370 corresponds with one of the sets of thru-holes on the slide mount 360, 362, 364. That is, each set of face plate thru-holes 366, 368, 370 can be aligned with one of the sets of slide mount thru-holes 360, 362, 364, thereby forming sets of thru-hole pairs 372, 374, 376.

Each set of thru-hole pairs 372, 374, 376 is associated with a different blade angle. For instance, in the illustrated embodiment, the first set of thru-hole pairs 372 is associated with an 8 degree blade angle; the second set of thru-hole pairs 374 is associated with a 9.5 degree blade angle; and the third set of thru-hole pairs 376 is associated with an 11 degree blade angle. These different blade angles are achieved by angling the first, second, and third sets of thru-holes on the slide mount 356 at 8, 9.5, and 11 degree angles, respectively, as shown in FIG. 12, but angling all the sets of thru-holes on the face plate at an 8 degree angle. Alternatively, the thru-holes on the face plate 332 could be provided with different angles, and the thru-holes on the slide mount 356 could be provided with the same angle.

In the illustrated embodiment, the slide mount 356 is mounted in a first position by fastening the slide mount 356 to the front face plate 332 with two bolts 380, 382, each of which extend through one set of corresponding thru-holes in the first set of thru-hole pairs 372. In the first position, the blade angle is 8 degrees. The blade angle can be adjusted by removing the bolts 380, 382 and tilting the slide mount 356 into a second position (not shown), in which the second set of slide mount thru-holes 362 are aligned with the second set of face plate thru-holes 368. In the second position, the blade angle is 9.5 degrees. Likewise, the blade angle can be adjusted into a third position (not shown), in which the third set of slide mount thru-holes 364 are aligned with the third set of face plate thru-holes 370. In the third position, the blade angle is 11 degrees.

This description illustrates a few embodiments of the present invention and should not be construed to limit the scope of the invention in any way. Other modifications and variations could be made to the assembly described without departing from the invention as defined by the appended claims and their equivalents. For instance, other systems for adjusting the blade angles could be used.

What is claimed is:

1. A cutting assembly for cutting a plant material, the plant material having a longitudinal axis, the cutting assembly comprising:

a frame for holding the plant material;

a blade assembly mounted to the frame and having at least a first blade, the first blade being movable along an oblique path relative to the longitudinal axis of the plant material into cutting engagement with the plant material; and an actuating system for moving the blade into cutting engagement with the plant material;

the blade assembly including a second blade and first and second blade mounting members, each of the first and second blades being movably mounted to one of the first and second blade mounting members, and wherein the blades are movable along paths that are substantially symmetric to one another about the longitudinal axis of the plant material and which paths end adjacent one another so that the plant material is cut into substantially a "V" shape.

2. A cutting assembly for cutting a plant material, the plant material having a longitudinal axis, the cutting assembly comprising:

a frame for holding the plant material;

a blade assembly mounted to the frame and having at least a first blade, the first blade being movable along an oblique path relative to the longitudinal axis of the plant material into cutting engagement with the plant material; and an actuating system for moving the blade into cutting engagement with the plant material;

the blade assembly including a second blade, wherein the first blade is slidable along a first path and the second blade is slidable along a second path, the first and second paths substantially forming a "V" shape.

3. A cutting assembly for cutting a plant material, the plant material having a longitudinal axis, the cutting assembly comprising:

a frame for holding the plant material;

a blade assembly mounted to the frame and having at least a first blade, the first blade being movable along an oblique path relative to the longitudinal axis of the plant material into cutting engagement with the plant material;

an actuating system for moving the blade into cutting engagement with the plant material; and an angle adjustment system operatively associated with the blade for permitting the angle at which the blade travels to be adjusted.

4. The assembly according to claim 3 in which the frame has at least first and second frame mounting holes and the blade assembly has at least first and second blade assembly mounting holes, the first frame mounting hole and the first blade assembly mounting hole alignable into a first position, in which the blade is movable at a first oblique angle, and the second frame mounting hole and the second blade assembly mounting hole alignable into a second position, in which the blade is movable at a second oblique angle, the first and second frame mounting holes and the first and second blade assembly mounting holes forming the angle adjustment system.

5. A machine for cutting an end of a scion, the machine comprising:

- a frame having a surface for supporting the scion as the scion lays across the surface;
- at least one blade movably mounted to the frame to move across the surface into cutting engagement with the scion to bevel the end of the scion; and
- an actuating device to move the blade along an oblique path relative to a longitudinal axis of the scion and into cutting engagement with the scion; and
  - a second blade movable across the surface into cutting engagement with the scion to bevel the end of the scion.

6. The machine according to claim 5 further comprising at least one activation member operatively coupled with the blades for activating the blades to move in unison.

7. The machine according to claim 5 in which the blades are movable in paths symmetric about the longitudinal axis of the scion.

8. A machine for cutting a scion, the scion having a longitudinal axis, the machine comprising:

- a frame;
- a scion support member mounted to the frame for supporting the scion;
- a hold down member adjacent the scion support member for holding the scion in the scion support member;
- a blade slide assembly mounted to the frame, the blade slide assembly including:
  - first and second slide mounts;
  - first and second slides operatively arranged to be slidable relative to the first and second slide mounts; and
  - first and second blades, each of the first and second blades having a tapered cutting edge, the first and second blades being mounted to the first and second slides, respectively; the first slide and the first blade being slidable along an oblique path relative to the longitudinal axis of the scion so that the cutting edges of the blades cut through the scion in the oblique direction; the second slide and the second blade being slidable in a direction substantially symmetric about the longitudinal axis to the oblique direction of the first slide and the first blade, so that sliding the first and second blades through the scion cuts an end of the scion into a "V" shape; and
- an actuating system for activating the slides and blades to cut the plant material.

9. The machine according to claim 8 in which the scion support member has an end beveled on one side in the oblique direction in which the first blade slides and on the other side in the oblique direction in which the second blade slides, and in which the first and second blades slide against the beveled sides.

* * * * *